United States Patent
Kumagai

(10) Patent No.: US 10,248,338 B2
(45) Date of Patent: Apr. 2, 2019

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Takekazu Kumagai, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/609,686

(22) Filed: May 31, 2017

(65) Prior Publication Data
US 2017/0351446 A1    Dec. 7, 2017

(30) Foreign Application Priority Data

Jun. 6, 2016  (JP) .................. 2016-112797

(51) Int. Cl.
| | |
|---|---|
| *G06F 3/06* | (2006.01) |
| *G06F 3/147* | (2006.01) |
| *G06F 3/0482* | (2013.01) |
| *H04N 1/00* | (2006.01) |
| *H04N 1/44* | (2006.01) |

(52) U.S. Cl.
CPC ............ *G06F 3/0619* (2013.01); *G06F 3/065* (2013.01); *G06F 3/0679* (2013.01); *G06F 3/147* (2013.01); *G06F 3/0482* (2013.01); *H04N 1/00413* (2013.01); *H04N 1/00965* (2013.01); *H04N 1/4433* (2013.01); *H04N 2201/0094* (2013.01)

(58) Field of Classification Search
CPC ...... G06F 3/0679; G06F 3/0619; G06F 3/065; G06F 3/147; G06F 3/0482
USPC .......................................... 711/103
See application file for complete search history.

(56) References Cited

U.S. PATENT DOCUMENTS

| | | | |
|---|---|---|---|
| 8,627,027 B2* | 1/2014 | Nakajima | ........... G06F 11/1456 711/162 |
| 8,810,845 B2* | 8/2014 | Yamada | ............. H04N 1/00326 358/1.13 |

FOREIGN PATENT DOCUMENTS

JP    2012-113444 A    6/2012

* cited by examiner

*Primary Examiner* — Hua J Song
(74) *Attorney, Agent, or Firm* — Canon U.S.A., Inc. IP Division

(57) ABSTRACT

An information processing apparatus configured to communicate with a connectable and removable nonvolatile storage device includes a display device, and a display control unit configured to control display processing that a storage device not specified as a backup destination for backing up data in the information processing apparatus is displayed on the display device as a removal instruction target, and a storage device specified as a backup destination is not displayed on the display device as a removal instruction target, wherein the display control unit is implemented by at least one processor.

10 Claims, 10 Drawing Sheets

FIG.6

| USER NAME | LOGIN PASSWORD | USER AUTHORITY | |
|---|---|---|---|
| Administrator | 0000 | ADMINISTRATOR | ~7010 |
| User1 | 0000 | GENERAL USER | ~7020 |

7000

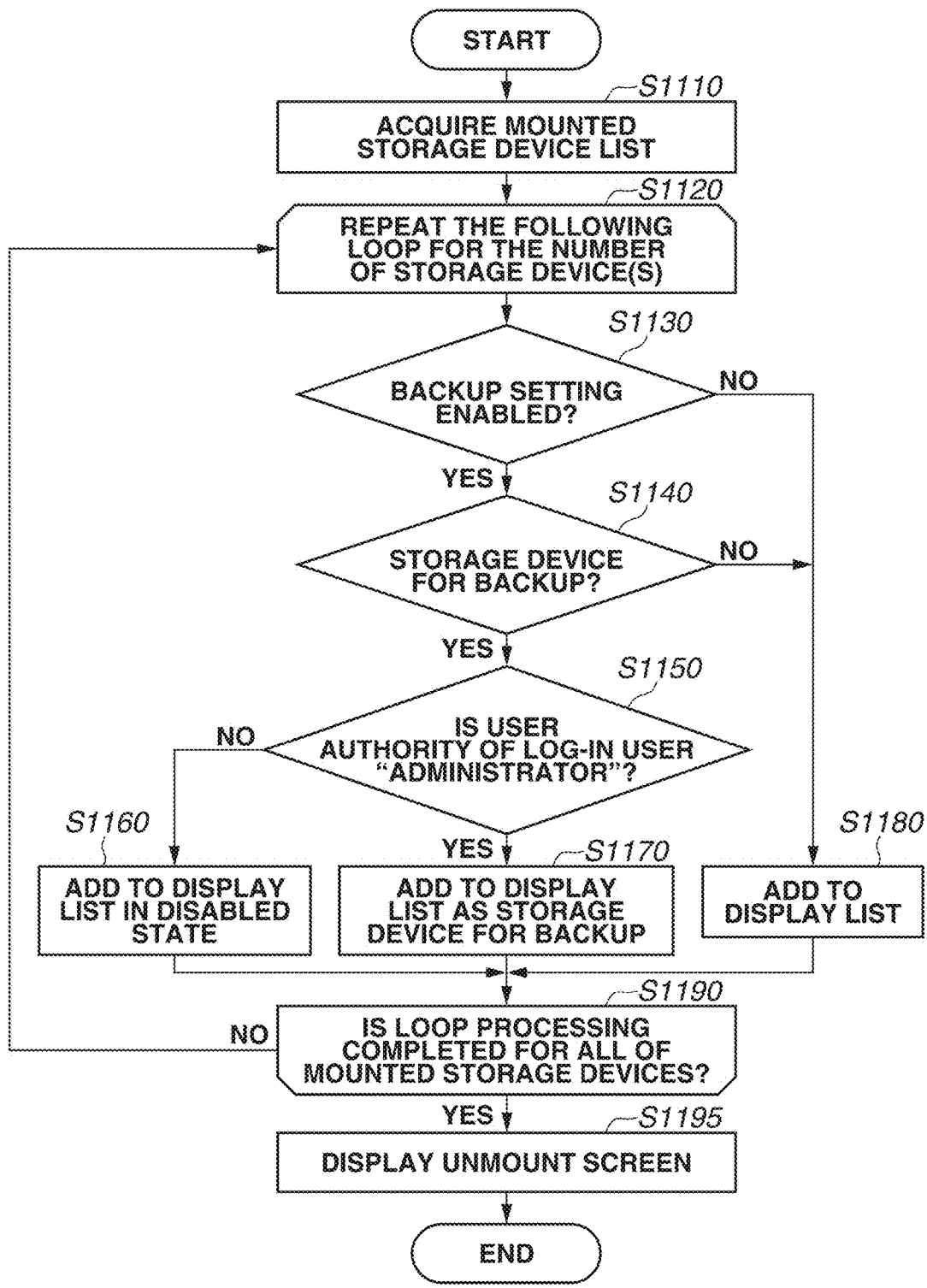

INFORMATION PROCESSING APPARATUS, METHOD FOR CONTROLLING INFORMATION PROCESSING APPARATUS, AND STORAGE MEDIUM

BACKGROUND

Field of Art

The present disclosure relates to an information processing apparatus, a method for controlling the information processing apparatus, and a storage medium.

Description of the Related Art

A certain information processing apparatus backs up data in an external storage device. For example, when backing up data in a Universal Serial Bus (USB) storage device as an example of an external storage device, the information processing apparatus performs processing (for example, mount processing) for setting the USB storage device in the operational state and then stores data in the USB storage device. When a user removes the USB storage device from the information processing apparatus, the information processing apparatus performs processing (for example, unmount processing) for setting the USB storage device in the removable state (Japanese Patent Application Laid-Open No. 2012-113444).

SUMMARY

According to an aspect of a present embodiment, an information processing apparatus configured to communicate with a connectable and removable nonvolatile storage device includes a display device, and a display control unit configured to control display processing that a storage device not specified as a backup destination for backing up data in the information processing apparatus is displayed on the display device as a removal instruction target, and a storage device specified as a backup destination is not displayed on the display device as a removal instruction target, wherein the display control unit is implemented by at least one processor.

Further features of the present invention will become apparent from the following description of exemplary embodiments with reference to the attached drawings.

BRIEF DESCRIPTION OF THE DRAWINGS

FIG. 6 illustrates an example of user information.

FIG. 10 is a flowchart illustrating a method for controlling the information processing apparatus.

DESCRIPTION OF THE EMBODIMENTS

For example, in a system in which a plurality of USB storage devices is connected to an information processing apparatus, it is assumed that a hard disk drive (HDD) connected via a USB interface for backup is set up. In such a system environment, when a user performs an operation for removing a USB storage device from the information processing apparatus, the information processing apparatus displays the USB storage device without distinguishing between a data storage device used for scan and print processing by the user and a USB storage device related to the system and programs. Thus, the user may incorrectly select a device removal of which the user requests. For this reason, there has been a problem of the difficulty in responding to a request for backing up the system at a suitable timing if the user does not notice that the USB storage device to be removed is a storage device for backup. The present embodiment provides a mechanism for preventing a storage device for backup from being accidentally unmounted, thus reducing the possibility of a backup failure, even if a plurality of storage devices is connected. Exemplary embodiments will be described below with reference to the accompanying drawings.

<Description of System Configuration>

A first exemplary embodiment will be described below with reference to the accompanying drawings.

Figure 1:
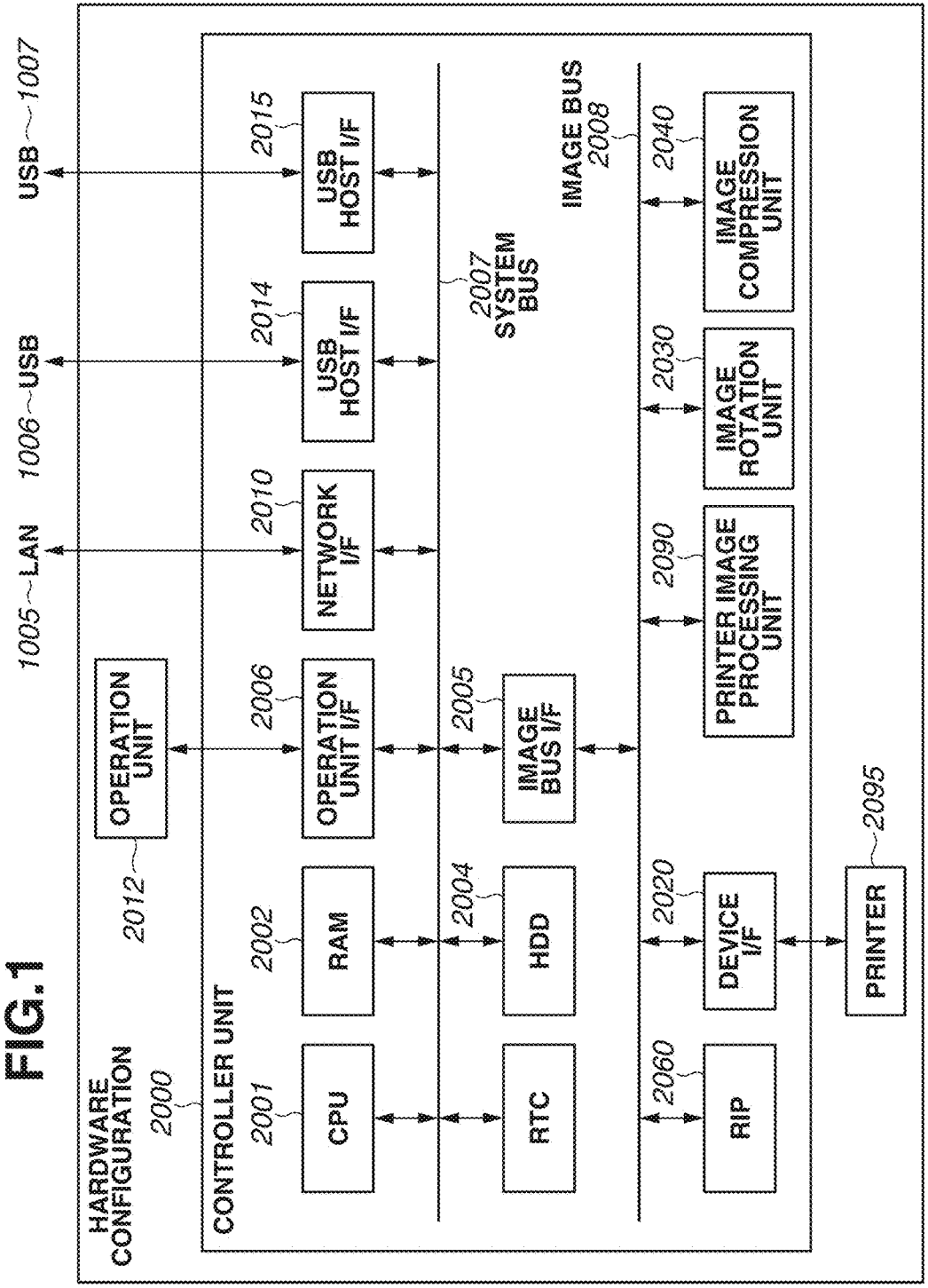
FIG. 1 illustrates a hardware configuration of an information processing apparatus.

FIG. 1 illustrates a hardware configuration of an information processing apparatus according to a first exemplary embodiment. The present exemplary embodiment will be described below centering on a multifunction peripheral (MFP) as an information processing apparatus having a plurality of USB HOST interfaces (I/Fs) as USB interfaces for connecting a USB storage device and a USB HDD. The USB HDD may be one example of a connectable and removable nonvolatile storage device. The USB HDD (described in detail below) will be specified as a medium for backing up data, i.e., document files according to the present exemplary embodiment. A backup schedule is configured to start the backup processing every day or at a specified time in a specified day of week, for example, based on a setting from a specific user (administrator) authenticated via a user interface (UI) screen (described below).

Referring to FIG. 1, a controller unit 2000 connects a printer 2095 as an image output device. By connecting with a local area network (LAN) 1005, the controller unit 2000 performs control for outputting and inputting print data, device information, etc. The controller unit 2000 includes a central processing unit (CPU) 2001 which activates an operating system (OS) by executing a boot program stored in a hard disk drive (HDD) 2004. Then, the CPU 2001 executes application programs stored in the HDD 2004 on the OS to implement various processing.

A random access memory (RAM) 2002 is used as a work area of the CPU 2001. In addition to the work area, the RAM 2002 offers an image storage area for temporarily storing image data. In addition to the above-described application programs, the HDD 2004 stores image data, history information, user information, and apparatus setting information.

Although, according to the present exemplary embodiment, a hard disk drive is used as the HDD 2004, a solid state drive (SSD) connectable via a similar interface to a hard disk drive can also be used. The RAM 2002 is connected to the CPU 2001 via a system bus 2007. An operation unit interface (operation unit I/F) 2006, a network interface (network I/F) 2010, and an image interface (image bus I/F) 2005 are connected to the CPU 2001. The operation unit I/F 2006 may be a display control unit, which may be implemented as dedicated circuitry or as a set of instructions stored on a non-transitory storage medium which is executed by at least one processor. The operation unit I/F 2006 may also be integrated into the CPU 2001.

The operation unit I/F 2006 is an interface with the operation unit 2012 having a touch panel and a plurality of hardware keys. The operation unit I/F 2006 outputs to the operation unit 2012 screen data to be displayed on the operation unit 2012 which may act as a display device. The printer may also communicate with other display devices to display screen data. The operation unit I/F 2006 sends to the CPU 2001 information input from the operation unit 2012 by the user. Then, the network I/F 2010 is connected to the LAN 1005 and outputs and inputs information to/from each apparatus on the LAN 1005 via the LAN 1005.

USB HOST I/Fs 2014 and 2015 are connected to the system bus 2007 to enable writing and reading data to/from USB storage devices connected to the USB connectors 1006 and 1007. Additional USB HOST I/Fs may also be connected to additional USB connectors and/or a USB hub. The USB connectors 1006 and 1007 are disposed at separate positions on the information processing apparatus. The USB connector 1006 is disposed near the operation unit 2012 so that the user can easily operate a USB storage device. On the other hand, the USB connector 1007 is disposed at a position near the LAN 1005 where the user cannot easily operate a USB storage device. This configuration is based on a consideration for reducing the possibility that an external storage device (storage medium) used in a constantly connected way is accidentally removed.

The image bus I/F 2005 is a bus bridge for connecting between the system bus 2007 and an image bus 2008 for transmitting image data at high speed and converting the data structure. The image bus 2008 is composed of a Peripheral Component Interconnect (PCI) bus or The Institute of Electrical and Electronics Engineers, Inc. (IEEE) 1394 bus. On the image bus 2008, a raster image processor (RIP) 2060, a device I/F 2020, a printer image processing unit 2090, an image rotation unit 2030, and an image compression unit 2040 are provided. The RIP 2060 is a processor for rasterizing a PDL code described in a Page Description Language (PDL) into a bitmap image. The device I/F 2020, to which a printer 2095 is connected, converts image data between a synchronous system and an asynchronous system. The printer image processing unit 2090 performs printer correction and resolution conversion on image data to be printed out. The image rotation unit 2030 rotates image data. The image compression unit 2040 performs processing for compressing multi-value image data into Joint Photographic Experts Group (JPEG) data and compressing binary image data into Joint Bi-level Image Experts Group (JBIG), Modified Modified READ (MMR), or Modified Huffman (MH) data, and performs processing for decompressing these data.

Figure 2:
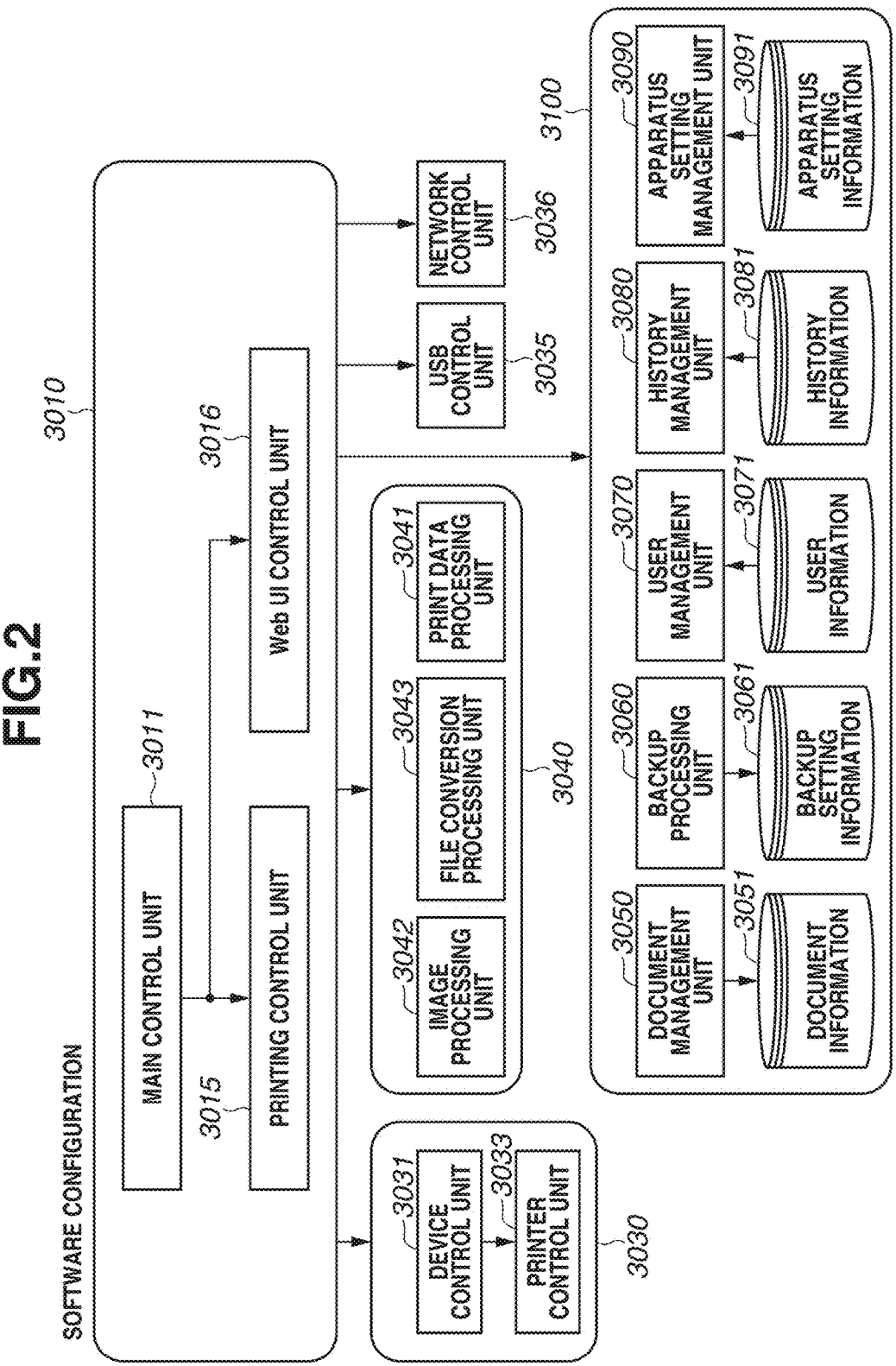
FIG. 2 illustrates a software configuration of the information processing apparatus.

FIG. 2 illustrates essential parts of a software configuration of an application program operating on a printing apparatus according to the present exemplary embodiment. One or more components of the application program may be stored as a control program on a non-transitory computer-readable storage medium and executed by one or more processors on the printing apparatus. One or more components of the application program may be received by the printing apparatus over a network interface. One or more components of the application program may be executed by processors that are connected to the printing apparatus via network interface.

Referring to FIG. 2, software includes an operation unit application 3010 for performing processing in response to a user operation on the operation unit 2012, a data management unit 3100 for managing data, a device control unit 3030, a USB control unit 3035, a network control unit 3036, and a print processing unit 3040.

The operation unit application 3010 includes the following control units. A main control unit 3011 performs basic input and output operations such as screen display and user's hardware key and touch panel operations. A printing control unit 3015 controls print data accumulation processing and print processing.

When external storage devices are connected to the USB connectors 1006 and 1007, the USB control unit 3035 performs mount processing to set the connected external storage devices in the accessible state. The external storage devices connected to the USB connectors may be example of a connectable and removable nonvolatile storage device. The USB connection is exemplary other methods may be used to connect the external storage devices. The USB control unit 3035 also performs unmount processing (described below) to cancel the accessible state. According to the present exemplary embodiment, processing for recognizing a plurality of interfaces for connecting a plurality of storage devices, recognizing each storage device connected to each interface, and setting each storage device in the usable state is referred to as mount processing. Processing for setting each storage device from the usable state to the removable state is referred to as unmount processing.

A WebUI control unit 3016 transmits a web page and receives web page operation information and files to/from a web browser operating on a personal computer (PC) 1002 connected by the LAN 1005 via the network control unit 3036. Then, the WebUI control unit 3016 controls the apparatus in response to a web page operation to generate a web page according to a control result and return the web page. A web page is configured by using a HyperText Markup Language (HTML) and JavaScript (registered trademark) and can be displayed and operated by using web browsers mounted on general PCs, smart phones, and tablet terminals.

The print processing unit 3040 includes a print data processing unit 3041, an image processing unit 3042, and a file conversion unit 3043. The print data processing unit 3041 reads and writes job attributes and controls the RIP 2060 to convert a PDL code into a bitmap image. The print data processing unit 3041 also controls the image rotation unit 2030 and the printer image processing unit 2090 to perform image processing on a print image.

The image processing unit 3042 converts a full-color image into a black-and-white image, a monochrome image, a 2-color image, etc. and performs enlargement and reduction processing. The image processing unit 3042 also performs processing for converting image data into print data.

The file conversion unit 3043 converts Portable Document Format (PDF) and XML Paper Specification (XPS) data into image data. A device control unit 3031 controls the printer 2095 via a printer control unit 3033.

The data management unit 3100 includes the following units. A document management unit 3050 performs processing for generating, changing, deleting, and browsing documents including files such as image data stored in the HDD 2004, processing for generating, changing, deleting, and browsing folders for storing documents, processing for changing attribute information of documents and folders, and processing for temporarily storing documents. Document information 3051 including these pieces of information is managed by the document management unit 3050.

A backup processing unit 3060 backs up the document information 3051 in the external storage device connected to the USB connector 1006 in accordance with a backup schedule that may be set by a setting unit which may be based on information provided in screen 5000 and stored as backup setting information. The setting unit may be implemented as a set of instructions that are stored in a non-transitory medium and executed by one or more processors or as dedicated circuitry. Data required for backup processing in the external storage device is managed as backup setting information 3061. The main control unit 3011 controls the backup processing unit 3060 to acquire a list of mounted external storage devices included in the backup setting information 3061 and performs control to display the list on the operation unit 2012 as described below.

A user management unit 3070 manages users of the apparatus. The user management unit 3070 enables generating, browsing, changing, and deleting users, and performing authentication processing such as login and logout. These pieces of information are managed as user information 3071. At least the user name, login password, and user authority of each user can be managed as the user information 3071.

When a user performs a login operation and succeeds in logging into the apparatus, the user management unit 3070 stores information of the user who has logged into the apparatus as log-in user information in the RAM 2002. When the user logs out of the apparatus, the user management unit 3070 clears the login user information.

A history management unit 3080 manages history information related to operations of the apparatus. The history management unit 3080 enables generating, browsing, and deleting the history information. These pieces of information are managed as history information 3081. An apparatus setting management unit 3090 manages various setting information related to operations of the apparatus. The apparatus setting management unit 3090 enables browsing and changing the setting information. These pieces of information are managed as apparatus setting information 3091.

Figure 3:
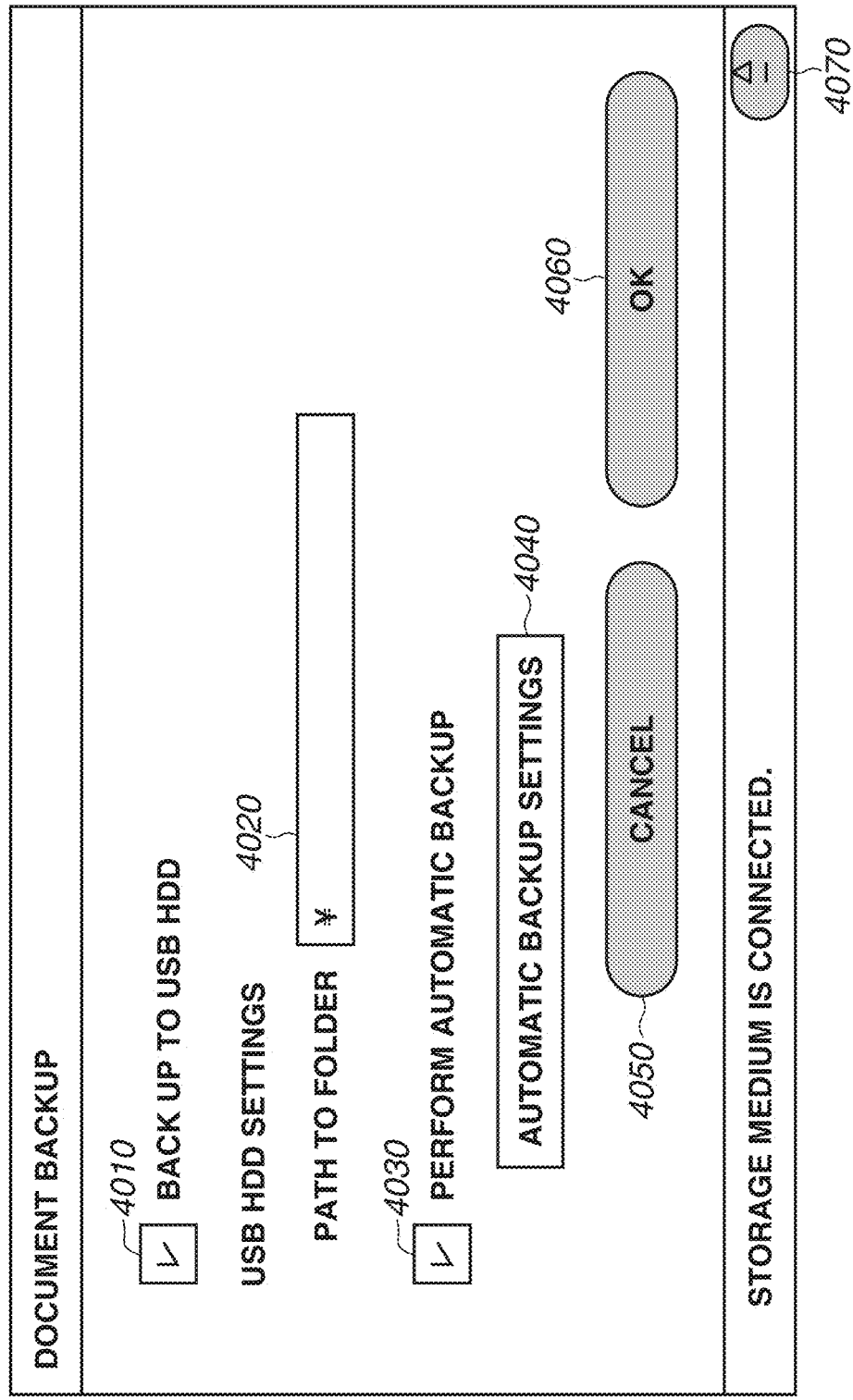
FIG. 3 illustrates a user interface (UI) screen displayed on an operation unit.

FIG. 3 illustrates a UI screen displayed on the operation unit 2012 illustrated in FIG. 1. This UI screen is an example screen for specifying a backup destination for the USB HDD as a USB device. This UI screen is displayed when the user performs a backup setting operation on the operation unit I/F 2006. Referring to FIG. 3, a check box 4010 is checked to set backup processing on the external storage device connected to the USB connector 1006. The check box 4010 in the checked state indicates that backup processing is set to be performed on the external storage device connected to the USB connector 1006.

A path input portion 4020 allows the user to input a file path of a file in the file system of the external storage device. The backup processing unit 3060 stores backup data in the path specified in the path input portion 4020. A check box 4030 is used to specify whether automatic backup is to be performed.

When automatic backup is specified, the backup processing unit 3060 starts backup processing when the specified time comes. The time when automatic backup is started can be specified in an automatic backup setting screen 5000 (FIG. 4) which is displayed when the user presses an "Automatic Backup Settings" button 4040. Automatic backup will be performed when the check box 4030 is checked. When the user presses the "Cancel" button 4050, changes made on this screen are canceled and the screen is closed. When the user presses the "OK" button 4060, the check boxes 4010 and 4030 and the path character string in this screen are stored in the backup setting information 3061, and the screen is closed.

An external storage device removal button 4070 is displayed when an external storage device is connected to the USB connector 1006 or 1007. The external storage device removal button 4070 is displayed on all screens (for example, the screen illustrated in FIG. 4).

Figure 4:
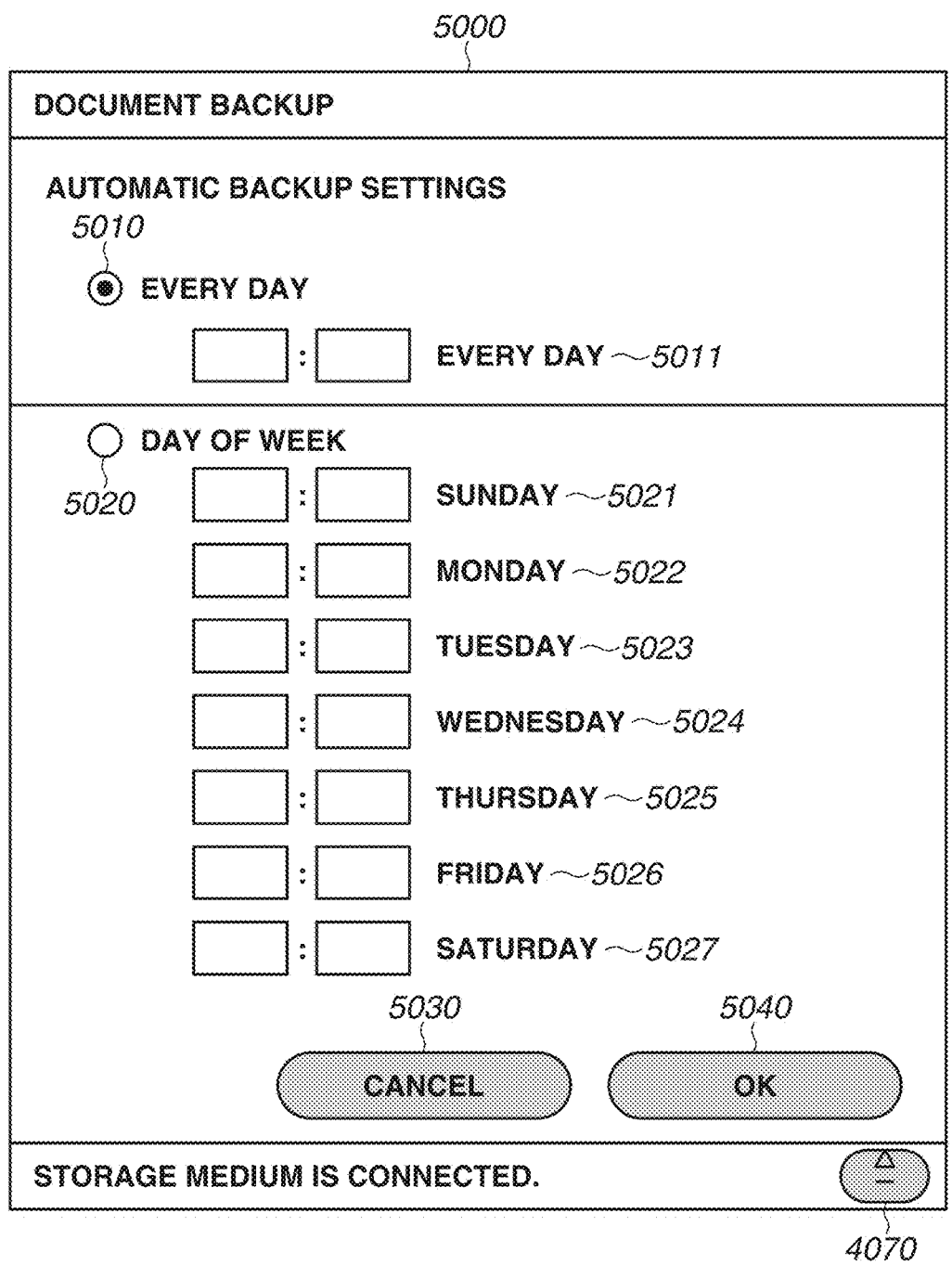
FIG. 4 illustrates a UI screen displayed on the operation unit.

FIG. 4 illustrates a UI screen displayed on the operation unit 2012 illustrated in FIG. 1. FIG. 4 illustrates an example of the automatic backup setting screen 5000 which is displayed when the user presses the "Automatic Backup Settings" button 4040.

Referring to FIG. 4, automatic backup settings include a "Every Day" setting for starting backup processing every day at the same time and a "Day of Week" setting for starting backup processing at a different time for each day of week.

The radio button 5010 is used to set the backup start time to the same time every day. The user specifies the backup start time in a time setting area 5011. More specifically, the user inputs numeric values in the blank fields by using the numeric keypad and cursor keys on the operation unit 2012.

The radio button 5020 is used to set the backup start time for each day of week. When the radio button 5020 is selected, the user specifies the backup start time for each day of week corresponding to time setting areas 5021, 5022, 5023, 5024, 5025, 5026, and 5027. More specifically, the user inputs numeric values in the blank fields by using the numeric keypad and cursor keys on the operation unit 2012.

When the user presses a "Cancel" button 5030, changes made on this screen are canceled and the screen is closed. When the user presses the "OK" button 5040, the radio buttons 5010 and 5020 and the backup setting time input to the time setting areas 5011, 5021, 5022, 5023, 5024, 5025, 5026, and 5027 are stored in the backup setting information 3061, and the screen is closed.

Figure 5:
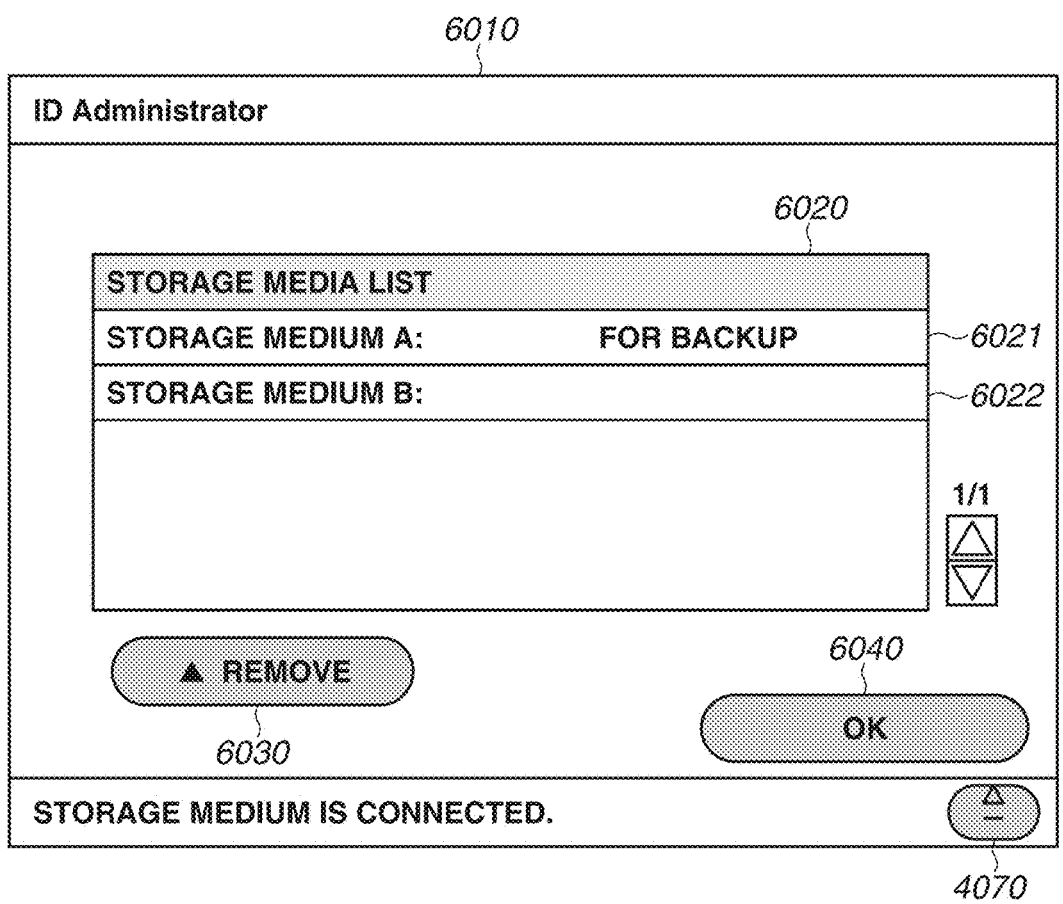
FIG. 5 illustrates a UI screen displayed on the operation unit.

FIG. 5 illustrates a UI screen displayed on the operation unit 2012 illustrated in FIG. 1. This UI screen is an example of a removable storage device list screen which is displayed when the user presses the external storage device removal button 4070. FIG. 5 illustrates a case where the login user has the user authority "administrator". The storage devices listed on the removable storage device list screen may be examples of potential removal instruction targets.

Referring to FIG. 5, a user name display portion 6010 displays the user name of the current log-in user who has logged into the apparatus. The user name display portion 6010 indicates that a user having the user name "Administrator" has logged into the apparatus. An external storage device list 6020 displays a list of external storage devices connected to the USB connectors 1006 and 1007. For convenience, a drive name "Storage Medium A:" 6021 is assigned to the storage device connected to the USB connector 1006, and a drive name "Storage Medium B:" 6022 is assigned to the storage device connected to the USB connector 1007.

In this case, "Storage Medium A:" is displayed with an additional character string indicating a storage device for backup. This enables preventing the user having user authority "administrator" from accidentally unmounting the external storage device for backup.

In the external storage device list 6020, the user can select at least one external storage device. The selected external storage device and an unselected external storage device are displayed in different ways so that these storage devices are distinguishable. In the example illustrated in FIG. 5, no external storage device is currently selected. When the user presses a "Remove" button 6030, that may be also labeled as 8030, 9030, for removing an external storage device, the CPU 2001 performs processing for unmounting the external storage device currently selected in the external storage device list 6020. When the user presses an "OK" button 6040, the screen is closed.

FIG. 6 illustrates an example of information managed in the user information 3071 illustrated in FIG. 2.

Referring to FIG. 6, a user information table 7000 is stored in the HDD 2004. Although, in this example, the user information table 7000 is stored in a file, a database may be used. In this case, user information 7010 and 7020 are managed. The user information 7010 includes the user name "Administrator", the login password "0000", and the user authority "administrator". The user information 7020 includes the user name "User1", the login password "0000", and the user authority "general user". A user having the user authority "administrator" is permitted to perform operations for managing the apparatus. On the other hand, a user having the user authority "general user" is permitted to perform limited operations for managing the apparatus.

Figure 7:
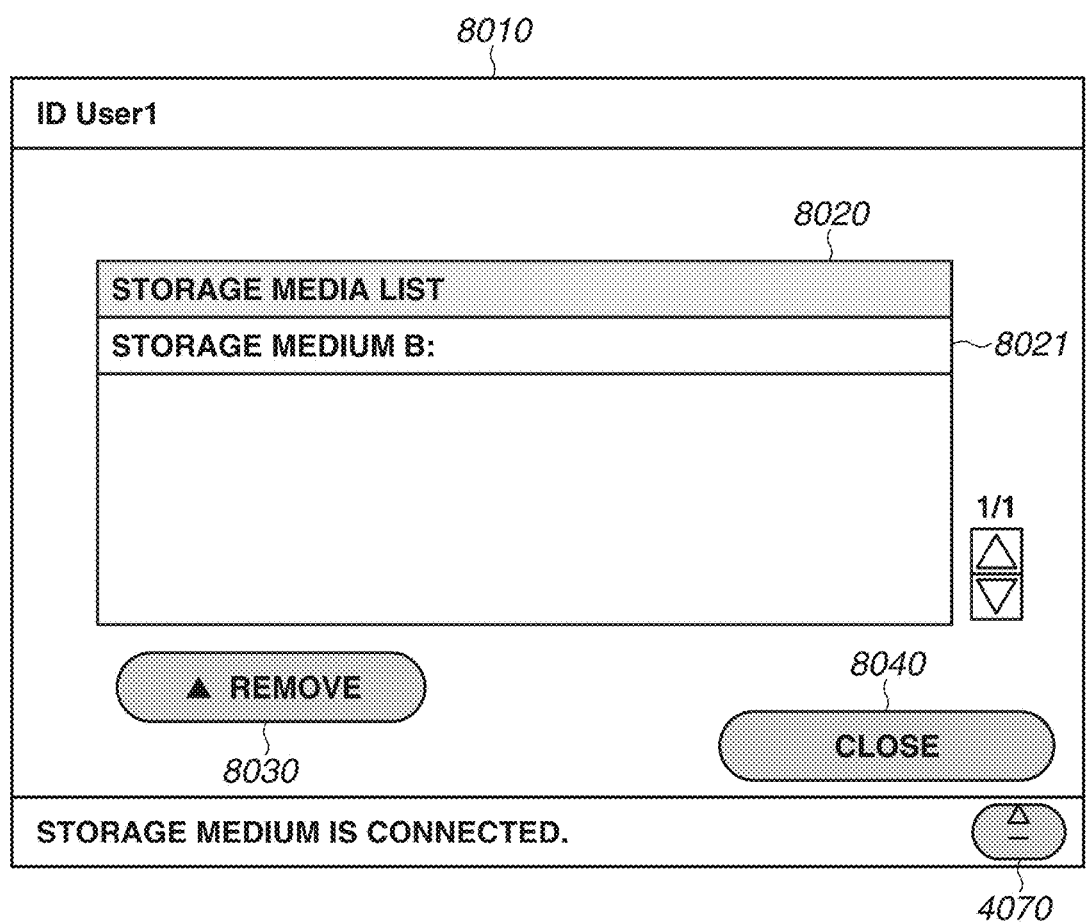
FIG. 7 illustrates a UI screen displayed on the operation unit.

FIG. 7 illustrates a UI screen displayed on the operation unit 2012 illustrated in FIG. 1. This UI screen is another example of an external storage device list screen which is displayed when the user presses the external storage device removal button 4070. FIG. 7 illustrates a case where the login user has the user authority "general user". The storage devices listed on the external storage device list screen may be examples of potential removal instruction targets.

Referring to FIG. 7, the user name display portion 8010 displays the user name of the current log-in user who has logged into the apparatus. The user name display portion 8010 indicates that a user having the user name "User1" has logged into the apparatus. An external storage device list 8020 displays a list of external storage devices connected to the USB connectors 1006 and 1007. In this case, the external storage device connected to the USB connector 1006 is not displayed. The external storage device connected to the USB connector 1007 is assigned with a drive name and displayed as a "Storage Medium B:" 8021. This enables preventing the user having user the authority "general user" from accidentally unmounting the external storage device for backup connected to the USB connector 1006.

In the external storage device list 8020, the user can select at least one external storage device. The selected external storage device and an unselected external storage device are displayed in different ways so that these storage devices are distinguishable. In the example illustrated in FIG. 7, no external storage device is currently selected.

When the user presses a "Remove" button 8030 for removing an external storage device, the CPU 2001 performs processing for unmounting the external storage device currently selected in the external storage device list 8020. Unmount processing refers to processing for removing an external storage device physically connected to the USB connector 1006 or 1007 from the management of the USB control unit 3035 to set the storage device in the inaccessible state in terms of software. When the user presses the "Close" button 8040, the screen is closed.

Figure 8:
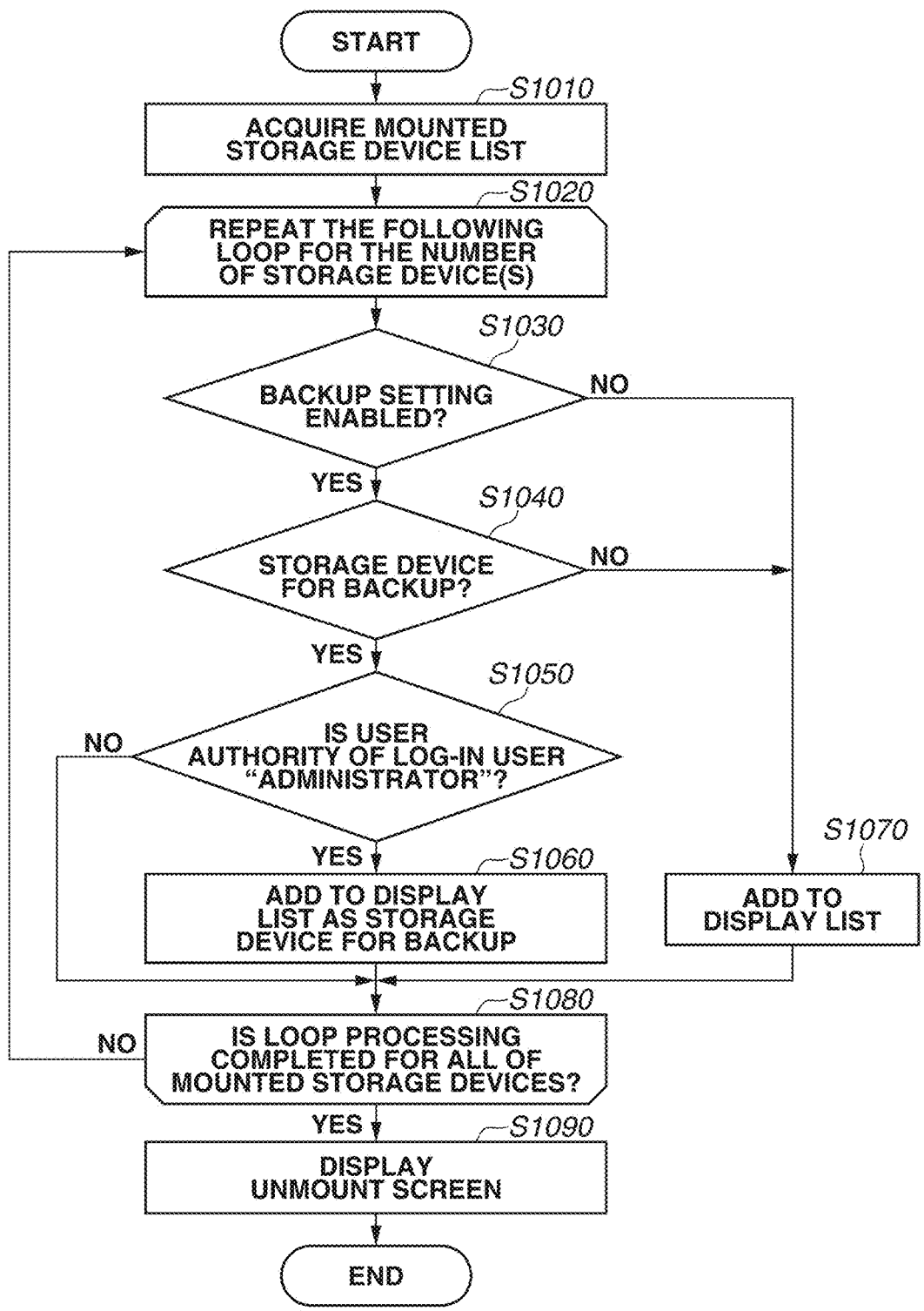
FIG. 8 is a flowchart illustrating a method for controlling the information processing apparatus.

FIG. 8 is a flowchart illustrating a method for controlling the information processing apparatus according to the present exemplary embodiment. This flowchart is an example of processing for displaying the external storage device removal screens illustrated in FIGS. 5 and 7, respectively.

Each step of this flowchart is implemented when the CPU 2001 executes a stored control program. This processing will be described below centering mainly on the modules implemented by the CPU 2001 illustrated in FIG. 2.

This processing is started when the user presses the external storage device removal button 4070 displayed on the operation unit 2012. In step S1010, the main control unit 3011 controls the USB control unit 3035 to acquire from the backup setting information 3061 a list of external storage devices mounted on the USB connectors 1006 and 1007. In step S1020, the main control unit 3011 performs loop processing of repeating processing in steps S1020 to S1080 for each external storage device detected to be mounted in step S1010.

In step S1030, the main control unit 3011 controls the backup processing unit 3060 to determine whether the backup setting is enabled. The main control unit 3011 determines whether the backup setting is enabled by referring to, the value specified by the check box 4010 illustrated in FIG. 3 as information stored in the backup setting information 3061.

When the main control unit 3011 determines that the backup setting is enabled (YES in step S1030), the processing proceeds to step S1040. On the other hand, when the main control unit 3011 determines that the backup setting is not enabled (NO in step S1030), the processing proceeds to step S1070.

In step S1040, the main control unit 3011 determines which of the USB connectors 1006 and 1007 the external storage device is connected to. When the main control unit 3011 determines that the external storage device is connected to the USB connector 1006, i.e., when the main control unit 3011 determines that the external storage device is a storage device for backup (YES in step S1040), the processing proceeds to step S1050. On the other hand, when the main control unit 3011 determines that the external storage device is not a storage device for backup (NO in step S1040), the processing proceeds to step S1070.

In step S1050, the main control unit 3011 controls the user management unit 3070 to determine whether the user authority of the log-in user is "administrator". Thus, the main control unit 3011 and/or the user management unit 3070 may act separately or together as a determination unit to determine if an authenticated user is a specified user, which may be implemented as instructions executed on one or more processors or as dedicated circuitry. Since the information of the log-in user is managed by the user information 3071, the main control unit 3011 collates the input user information or read user information with managed administrator information to determine whether the user authority of the user who has logged into the apparatus is "administrator". That is, it is determined that the user who has logged into the apparatus is "administrator". When the main control unit 3011 determines that the user authority of the log-in user is "administrator" (YES in step S1050), the processing proceeds to step S1060. On the other hand, when the main control unit 3011 determines that the user authority of the user is not "administrator" (NO in step S1050), the processing proceeds to step S1080.

In step S1060, the main control unit 3011 adds external storage device information to the external storage device list (storage media list) 6020 with additional information "For Backup". In step S1070, the main control unit 3011 adds external storage device information to the external storage device list 6020.

In step S1080, the main control unit 3011 determines whether the loop processing is completed for all of the external storage devices mounted through status control. When the main control unit 3011 determines that the loop processing is completed not for all of the external storage devices (No in step S1080), the processing returns to step S1020, and the main control unit 3011 repeats the loop processing. On the other hand, when the main control unit 3011 determines that the loop processing is completed for all of the external storage devices (YES in step S1080), the processing proceeds to step S1090. In step S1090, the main control unit 3011 displays the external storage device removal screen on the operation unit 2012 and ends the processing for this screen.

According to the present exemplary embodiment, when the user who has logged into the apparatus is not an administrator, the main control unit 3011 performs control not to execute step S1060. Therefore, the storage device specified as the backup destination is not displayed in the external storage device list 6020 confirmed on the operation unit 2012 by a general user. This enables preventing a general user from accidentally unmounting as a removal target storage device the USB HDD specified as the backup destination.

Figure 9:
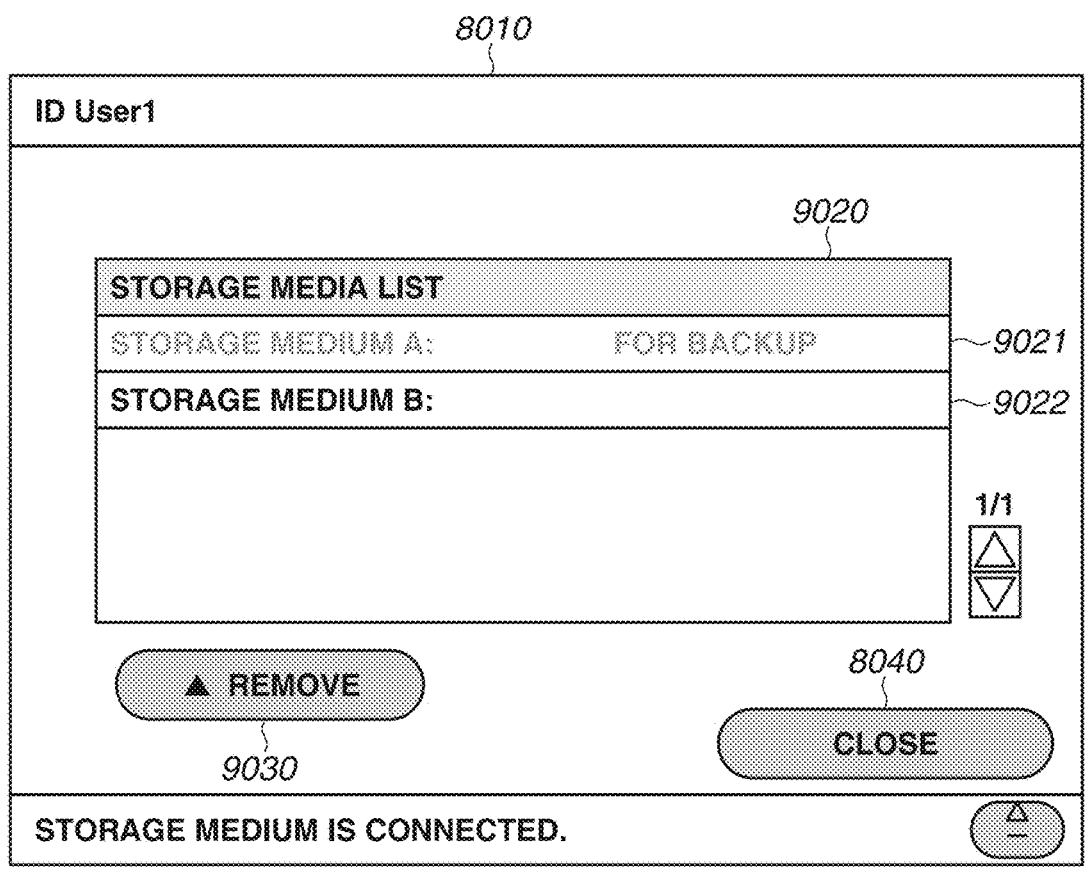
FIG. 9 illustrates a UI screen displayed on the operation unit.

FIG. 9 illustrates a UI screen displayed on the operation unit 2012 illustrated in FIG. 1. This UI screen is another example of the external storage device removal screen displayed when the user presses the external storage device removal button 4070 for removing an external storage device. The storage devices listed on the external storage device removal screen may be examples of potential removal instruction targets.

Referring to FIG. 9, the user name of the current log-in user who has logged into the apparatus is displayed on the user name display portion 8010. The user name display portion 8010 indicates that a user having the user name "User1" has logged into the apparatus. An external storage device list 9020 displays a list of external storage devices connected to the USB connectors 1006 and 1007. For convenience, the external storage device connected to the USB connector 1006 is displayed as a "Storage Medium A:" 9021 with an additional character string indicating a storage device for backup. Further, this external storage device is displayed in gray indicating that the storage device is not selectable. In an alternative embodiment, the storage medium that is not selectable may be displayed in manner that is distinguishable from the storage medium that is selectable (i.e. different fonts, font color, font effect, font background, marker, etc.).

The external storage device connected to the USB connector 1007 is displayed as a "Storage Medium B:" 9022 which is assigned a drive name. This enables preventing the user having user authority "general user" from accidentally unmounting the external storage device for backup.

At least one external storage device can be selected in the external storage device list 9020. The selected external storage device and an unselected external storage device are displayed in different ways so that these storage devices are distinguishable. In the example illustrated in FIG. 9, no external storage device is currently selected. When the user presses a "Remove" button 9030 for removing an external storage device, the CPU 2001 performs processing for unmounting the external storage device currently selected in the external storage device list 9020. When the user presses the "Close" button 8040, the screen is closed.

FIG. 10 is a flowchart illustrating a method for controlling the information processing apparatus according to the second exemplary embodiment. This flowchart is an example of processing for displaying the external storage device removal screen illustrated in FIG. 9 in a distinguishable way. Each step of this flowchart is implemented when the CPU 2001 executes a stored control program. This processing will be described below centering mainly on the modules implemented by the CPU 2001 illustrated in FIG. 2.

Processing in steps S1110 to S1140 is similar to that illustrated in FIG. 8, and redundant descriptions thereof will be omitted.

In step S1150, the main control unit 3011 controls the user management unit 3070 to determine whether the user authority of the log-in user is "administrator". When the main control unit 3011 determines that the user authority of the user is "administrator" (YES in step S1150), the processing proceeds to step S1170. On the other hand, when the main control unit 3011 determines that the user authority of the user is not "administrator" (NO in step S1150), the processing proceeds to step S1160.

In step S1160, the main control unit 3011 adds external storage device information to the external storage device list 9020 with additional information "For Backup" in the disabled state. In step S1170, the main control unit 3011 adds external storage device information to the external storage device list 9020 with additional information "For Backup" in the selectable state on the UI screen illustrated in FIG. 9. In step S1180, the main control unit 3011 adds external storage device information to the external storage device list 9020 in the selectable state.

In step S1190, the main control unit 3011 determines whether the loop processing is completed for all of the mounted external storage devices. When the main control unit 3011 determines that the loop processing is not completed for all of the external storage devices (NO in step S1190), the processing returns to step S1120, and the main control unit 3011 repeats the loop processing. On the other hand, when the main control unit 3011 determines that the loop processing is completed for all of the external storage devices (YES in step S1190), the processing proceeds to step S1195. In step S1195, the main control unit 3011 displays the external storage device removal screen on the operation unit 2012 and ends the processing.

According to the present exemplary embodiment, regardless of whether the authentication target user is a general user or an administrator, the main control unit 3011 adds "Storage Medium A:" and "Storage Medium B:" to the external storage device list 9020. However, when the authentication target user is a general user, the main control unit 3011 adds external storage device information with "Storage Medium A:" displayed in the disabled state (for example, displayed in gray or shaded) in the UI screen illustrated in FIG. 9. On the other hand, when the authentication target user is an administrator, the main control unit 3011 adds external storage device information with both "Storage Medium A:" and "Storage Medium B:" displayed in the selectable state (for example, displayed in gray or shaded) in the UI screen illustrated in FIG. 9.

According to the present exemplary embodiment, the user, whether a general user or an administrator, can confirm a list of a plurality of mounted storage devices. However, display control is performed not to allow a general user to select the storage device specified as the backup destination as a removal candidate device. On the other hand, the administrator is allowed to confirm that the storage medium to be unmounted is "Storage Medium A:" in the list of the mounted storage devices. This enables preventing a user other than the administrator who will perform unmount processing from selecting "Storage Medium A:" from the displayed list and starting unmount processing. As additional control, when making display for identification, a message may be displayed on the UI screen illustrated in FIG. 9.

As another additional control, when the specified USB HDD is connected and mount processing is completed, backup processing may be automatically started.

As yet another additional control, when the main control unit 3011 determines that the remaining amount of writable space on the HDD is not sufficient when performing backup processing, a related warning may be displayed on the UI screen.

As yet another additional control, when a request for removing any one storage device is received and a backup schedule is set, the user may be notified of a time period during which the removal target storage device should be reconnected by a warning unit. The warning unit may be implemented by instructions stored on a non-transitory computer readable medium which are executed by one or more processors. The warning unit may issue a message to a user via a notification unit which may display a message on the operation unit 2012. The notification unit and warning unit may be implemented as instructions encoded on a non-transitory computer readable medium which is executed by one or more processors or as dedicated circuitry. The time period during which the removal target storage device should be reconnected may be the time of the next scheduled backup or may be a predetermined period before the next scheduled backup.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-112797, filed Jun. 6, 2016, which is hereby incorporated by reference herein in its entirety.

What is claimed is:

1. An information processing apparatus configured to communicate with a connectable and removable nonvolatile storage device, the information processing apparatus comprising:
   a display device;
   one or more processors; and
   one or more memories storing instructions, when executed by the one or more processors, causing the information processing apparatus to function as;
   a backup processing unit configured to acquire a list of storage devices connected to the image processing apparatus and determine a backup setting information set in the image processing apparatus; and
   a display control unit configured to display on the display device the list of storage devices connected to the image processing apparatus,
   wherein based on the determined backup setting information, a storage device not specified as a backup destination for backing up data in the information processing apparatus is displayed on the display device as a removal instruction target, and
   wherein based on the determined backup setting information, a storage device specified as a backup destination is not displayed on the display device as a removal instruction target to prevent the storage device for backup from being disconnected.

2. The information processing apparatus according to claim 1, further comprising a determination unit configured to determine whether an authenticated user is a specific user, wherein, in a case where a request for removing any one storage device is received from the specific user, the storage device specified as the backup destination out of removable storage devices displayed in a storage device list.

3. The information processing apparatus according to claim 1, further comprising a determination unit configured to determine whether an authenticated user is a specific user, wherein, in a case where a request for removing any one storage device is received from a user different from the specific user, the storage device specified as the backup destination and the storage device not specified as the backup destination are displayed in a storage device list in a distinguishable way.

4. The information processing apparatus according to claim 1, further comprising a setting unit configured to set a backup schedule for the storage device specified as the backup destination.

5. The information processing apparatus according to claim 1, further comprising a warning unit configured to, in a case where a request for removing any one storage device is received, warn that the storage device is specified as the backup destination.

6. The information processing apparatus according to claim 4, further comprising a notification unit configured to notify a time period during which the storage device specified as the backup destination should be reconnected in a case where a request for removing any one storage device is received and the backup schedule is set by the setting unit.

7. The information processing apparatus according to claim 1, wherein the connectable and removable nonvolatile storage device is connected via a USB interface to the information processing apparatus.

8. The information processing apparatus according to claim 1, wherein the storage device is a USB storage device.

9. A method for controlling an information processing apparatus provided with a display device and configured to communicate with a connectable and removable nonvolatile storage device, the method comprising:
   acquiring a list of storage devices connected to the image processing apparatus;
   determining a backup setting information set in the image processing apparatus; and
   displaying on the display device the list of storage devices connected to the image processing apparatus,
   wherein based on the determined backup setting information, a storage device not specified as a backup destination for backing up data in the information processing apparatus is displayed on the display device as a removal instruction target, and
   wherein based on the determined backup setting information, a storage device specified as a backup destination is not displayed on the display device as a removal instruction target to prevent the storage device for backup from being disconnected.

10. A non-transitory computer-readable storage medium storing a control program for executing a method for controlling an information processing apparatus provided with a display device and configured to communicate with a connectable and removable nonvolatile storage device, the method comprising:
    acquiring a list of storage devices connected to the image processing apparatus;
    determining a backup setting information set in the image processing apparatus; and
    displaying on the display device the list of storage devices connected to the image processing apparatus, wherein based on the determined backup setting information, a storage device not specified as a backup destination for backing up data in the information processing apparatus is displayed on the display device as a removal instruction target, and wherein based on the determined backup setting information, a storage device specified as a backup destination is not displayed on the display device as a removal instruction target to prevent the storage device for backup from being disconnected.

* * * * *